(12) United States Patent
Itoh et al.

(10) Patent No.: US 9,652,059 B2
(45) Date of Patent: May 16, 2017

(54) TRANSPARENT ELECTROCONDUCTIVE LAMINATE AND TRANSPARENT TOUCH PANEL

(75) Inventors: Haruhiko Itoh, Hino (JP); Koichi Imamura, Tokyo (JP)

(73) Assignees: TEIJIN LIMITED, Osaka (JP); TEIJIN CHEMICALS LTD., Tokyo (JP)

( * ) Notice: Subject to any disclaimer, the term of this patent is extended or adjusted under 35 U.S.C. 154(b) by 755 days.

(21) Appl. No.: 13/142,342

(22) PCT Filed: Oct. 7, 2009

(86) PCT No.: PCT/JP2009/067501
§ 371 (c)(1),
(2), (4) Date: Sep. 26, 2011

(87) PCT Pub. No.: WO2010/073797
PCT Pub. Date: Jul. 1, 2010

(65) Prior Publication Data
US 2012/0015144 A1  Jan. 19, 2012

(30) Foreign Application Priority Data

Dec. 26, 2008  (JP) ................................. 2008-335249
Dec. 26, 2008  (JP) ................................. 2008-335278

(51) Int. Cl.
*G06F 3/041* (2006.01)
*G02F 1/1333* (2006.01)

(52) U.S. Cl.
CPC .......... *G06F 3/041* (2013.01); *G02F 1/13338* (2013.01); *Y10T 428/24355* (2015.01); *Y10T 428/24364* (2015.01)

(58) Field of Classification Search
CPC ............... B32B 27/08; G02F 1/133711; G02F 1/13338; Y10T 428/24355; Y10T 428/24364
(Continued)

(56) References Cited

U.S. PATENT DOCUMENTS 6,587,097 B1 * 7/2003 Aufderheide ........... G06F 3/045
345/104
2003/0068486 A1 * 4/2003 Arney et al. .................. 428/323
(Continued)

FOREIGN PATENT DOCUMENTS

CN          1914523 A  *  2/2007
EP       2 006 711 A2     12/2008
(Continued)

OTHER PUBLICATIONS

CN 1914523 A, machine translation.*
(Continued)

*Primary Examiner* — Maria Veronica Ewald
*Assistant Examiner* — Travis Figg
(74) *Attorney, Agent, or Firm* — Sughrue Mion, PLLC

(57) ABSTRACT

Disclosed is a transparent electroconductive laminate which achieves the required transparency or haze characteristic while having a desirable slipperiness in terms of handleability. Further disclosed is a transparent touch panel having said transparent electroconductive laminate. The transparent laminate (10) has a transparent organic polymer substrate (1), a transparent electroconductive layer (2) on one face of the transparent organic polymer substrate, and a cured resin layer (3) with a concavo-convex surface on the other face of the transparent organic polymer substrate, and the transparent touch panel has said transparent electroconductive laminate. The cured resin layer (3) has a concavo-convex surface by being formed from a coating composition which contains
(Continued)

two types of polymerizable components which mutually phase-separate on the basis of the physical difference therebetween.

19 Claims, 3 Drawing Sheets

(58) Field of Classification Search
USPC .......................................... 428/142, 202, 143
See application file for complete search history.

(56) References Cited

U.S. PATENT DOCUMENTS

| | | |
|---|---|---|
| 2005/0019555 A1 | 1/2005 | Yano et al. |
| 2009/0029151 A1* | 1/2009 | Noguchi ............... B32B 27/00 428/327 |
| 2009/0315849 A1 | 12/2009 | Ito |

FOREIGN PATENT DOCUMENTS

| | | | |
|---|---|---|---|
| EP | 2 109 116 A1 | | 10/2009 |
| JP | 6-67789 A | | 3/1994 |
| JP | 2001-42301 A | | 2/2001 |
| JP | 2002-163933 A | | 6/2002 |
| JP | 2004-151937 A | | 5/2004 |
| JP | 2005-36205 A | | 2/2005 |
| JP | 2005-066919 A | | 3/2005 |
| JP | 2005209431 | * | 8/2005 |
| JP | 2005209431 A | * | 8/2005 |
| JP | 2007-42284 A | | 2/2007 |
| JP | 2007-182519 A | | 7/2007 |
| JP | 2007-234424 A | | 9/2007 |
| JP | 3998697 B2 | * | 10/2007 |
| JP | 2009-123685 A | | 6/2009 |
| WO | 03/093008 A1 | | 11/2003 |
| WO | 2005/073763 A1 | | 8/2005 |
| WO | WO 2007099721 A1 | * | 9/2007 |
| WO | 2008/088059 A1 | | 7/2008 |

OTHER PUBLICATIONS

JP 3998697 B2 Machine Translation.*
JP 2005209431 A Machine Translation.*
European Search Report dated Jul. 13, 2012 for Application No. 09834603.4-2205/2383752 PCT/JP2009067501.
K. W. Suh, et al., "Cohesive Energy Densities of Polymers from Turbidimetric Titrations", Journal of Polymer Science, 1967, p. 1671-1681, vol. 5, Part A-1.

* cited by examiner

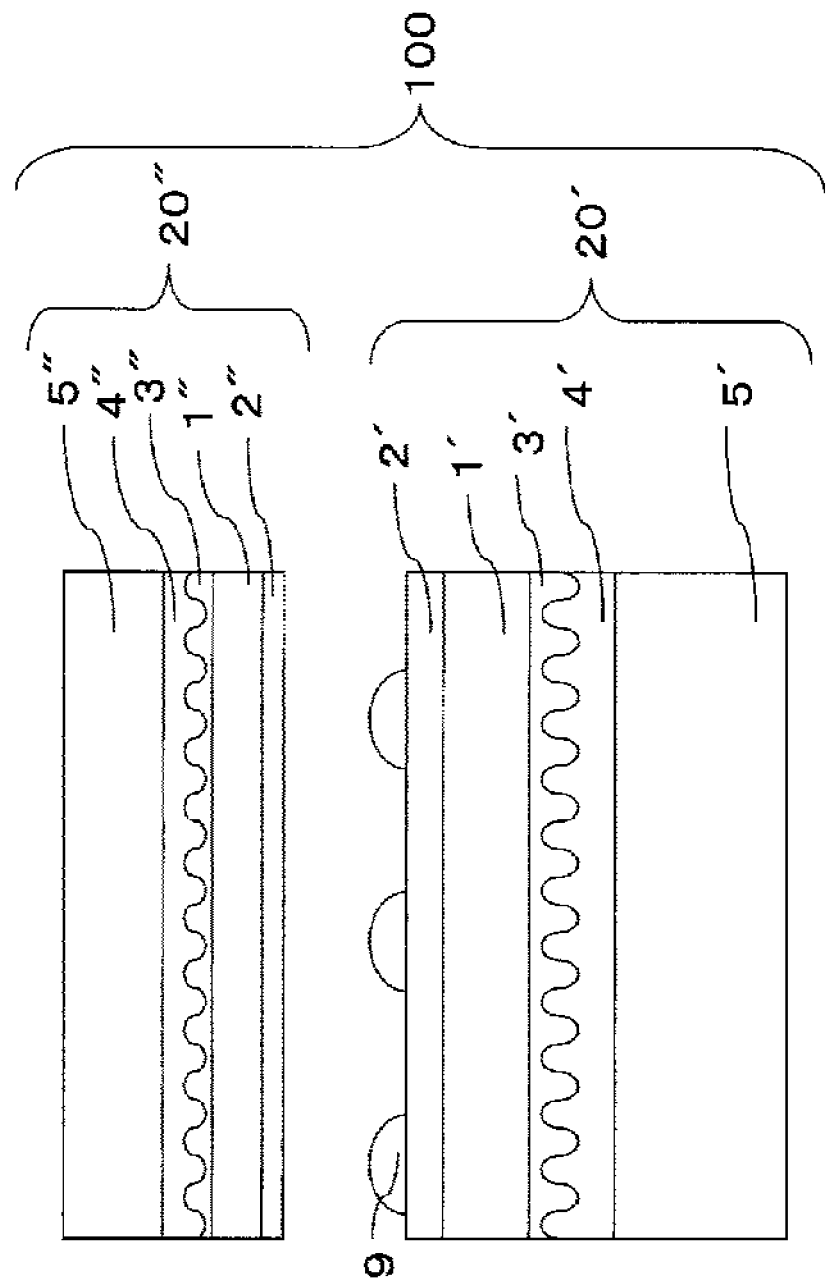

TRANSPARENT ELECTROCONDUCTIVE LAMINATE AND TRANSPARENT TOUCH PANEL

TECHNICAL FIELD

The present invention relates to a transparent electroconductive laminate. More specifically, the present invention relates to a transparent electroconductive laminate for liquid crystal displays (LCD), transparent touch panels, organic electroluminescence devices, inorganic electroluminescence lamps, electromagnetic wave shielding materials and the like, particularly a transparent electroconductive laminate for an electrode substrate of a transparent touch panel. The present invention also relates to a transparent touch panel having such a transparent electroconductive laminate.

BACKGROUND ART

As a transparent organic polymer substrate used for optical applications, for example, as a transparent organic polymer substrate used for liquid crystal displays (LCD), touch panels, etc., a cellulose-based film such as triacetyl cellulose (TAC)-based film, a polyester-based film such as polyethylene terephthalate (PET)-based film, and the like are known.

Such a transparent organic polymer substrate lacks lubricity for handling and suffers bad handleability, and therefore a method of forming a lubricating layer on the surface to enhance the lubricity has been proposed. For producing the lubricating layer, it is known to use a binder containing inorganic particles such as silica, calcium carbonate and kaolin and/or organic particles such as crosslinked polyester.

However, in the case of using a lubricating layer formed of such a binder containing inorganic particles and/or organic particles, light is scattered by the particles contained in the binder, and thereby a problem of impairing the transparency or haze characteristics of the obtained transparent organic polymer substrate occurs.

In order to solve this problem, for example, in Patent Document 1, an optical laminate comprising a polyester film is obtained, the film having a lubricating layer which contains inorganic particles and/or organic particles, and fine particles attributable to a catalyst and satisfying specific conditions existing in the film.

RELATED ART DOCUMENT

Patent Document

Patent Document 1: International Patent Publication No. WO2003/093008

SUMMARY OF THE INVENTION

Problems to be Solved by the Invention

The above-described handleability problem occurs also regarding a transparent electroconductive laminate having a transparent electroconductive layer on one surface of a transparent organic polymer substrate, and therefore it may be considered to use, also for such a transparent electroconductive laminate, a lubricating layer formed of a binder containing inorganic particles and/or organic particles. However, transparency or haze characteristics of the transparent electroconductive laminate, particularly those of the transparent electroconductive laminate used as an electrode substrate of a transparent touch panel, are very important. Therefore, it is being demanded to provide a transparent electroconductive laminate capable of achieving the required transparency or haze characteristics while having preferred lubricity in view of handleability.

A transparent organic polymer substrate used for optical applications is generally supplied to the user in the form of a temporary surface protective film laminated to the surface in order to protect the surface thereof, and the temporary surface protective film is separated and removed by the user before or after use of the substrate. Accordingly, the transparent electroconductive laminate having preferred haze characteristics and the like is more preferably configured so that the surface can be protected by a temporary surface protective film during transport and storage, and the temporary surface protective film can be separated and removed when it becomes not useful, in the same manner as a transparent electroconductive laminate having a conventional lubricating layer formed of a binder containing inorganic particles and/or organic particles having an average primary particle diameter of 200 nm or more.

Means to Solve the Problems

The transparent electroconductive laminate of the present invention comprises a transparent organic polymer substrate, a transparent electroconductive layer on one surface of the transparent organic polymer substrate, and a cured resin layer having an uneven surface on another surface of the transparent organic polymer substrate. The cured resin layer has an uneven surface formed from a coating composition containing at least two components which undergo phase separation due to the difference in physical properties thereof.

Particularly, according to the transparent electroconductive laminate of a first embodiment of the present invention, the cured resin layer does not contain inorganic and/or organic fine particles having an average primary particle diameter of 200 nm or more, the cured resin layer contains metal oxide and/or metal fluoride ultrafine particles having an average primary particle diameter of less than 200 nm, and the amount of the ultrafine particles contained in the cured resin layer is from 0.01 to 7.5 parts by mass per 100 parts by mass of the cured resin component.

Also, according to the transparent electroconductive laminate of a second embodiment of the present invention, the cured resin layer does not contain inorganic and/or organic fine particles for forming the uneven surface, the arithmetic average roughness (Ra) of the uneven surface of the cured resin layer is from 5 nm to less than 500 nm, and the ten-point average roughness (Rz) of the uneven surface of the cured resin layer is from 50 nm to less than 2,000 nm.

Effects of the Invention

According to the transparent electroconductive laminate of the present invention, particularly, according to the transparent electroconductive laminates of the first and second embodiments of the present invention, good transparency or haze characteristics are achieved while having preferred lubricity for handleability. Also, according to the transparent electroconductive laminate of the first embodiment of the present invention, a temporary surface protective film can be separated and removed in the same manner as in the case of a transparent electroconductive element having a conventional lubricating layer. Furthermore, according to the present invention, a transparent touch panel having such a transparent electroconductive laminate is provided.

BRIEF DESCRIPTION OF THE DRAWINGS

FIG. 5 A schematic view of the transparent touch panel of the present invention.

MODE FOR CARRYING OUT THE INVENTION

Transparent Electroconductive Laminate

The transparent electroconductive laminate of the present invention has a transparent organic polymer substrate, a transparent electroconductive layer on one surface of the transparent organic polymer substrate, and a cured resin layer having an uneven surface on another surface of the transparent organic polymer substrate. In the transparent electroconductive laminate of the present invention, an adhesive layer and a second transparent substrate may be stacked in order on the uneven surface of the cured resin layer on the transparent organic polymer substrate (first transparent substrate).

FIGS. 1 to 4 show examples of the transparent electroconductive laminate of the present invention.

Figure 1:
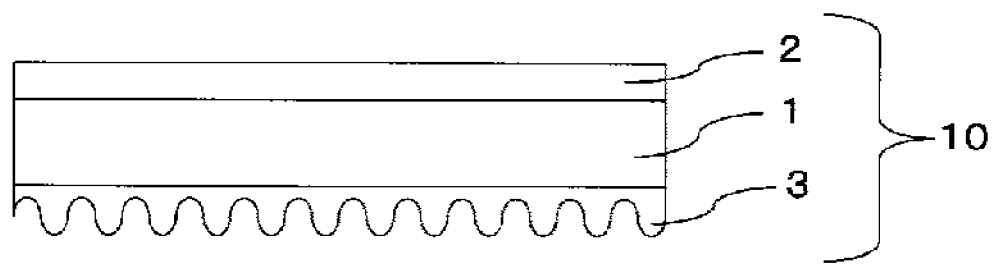
FIG. 1 A schematic view of the transparent electroconductive laminate of the present invention.

The transparent electroconductive laminate 10 of the present invention illustrated in FIG. 1 has a transparent organic polymer substrate 1, a transparent electroconductive layer 2 on one surface of the transparent organic polymer substrate 1, and a cured resin layer 3 having an uneven surface on another surface of the transparent organic polymer substrate 1.

Figure 2:
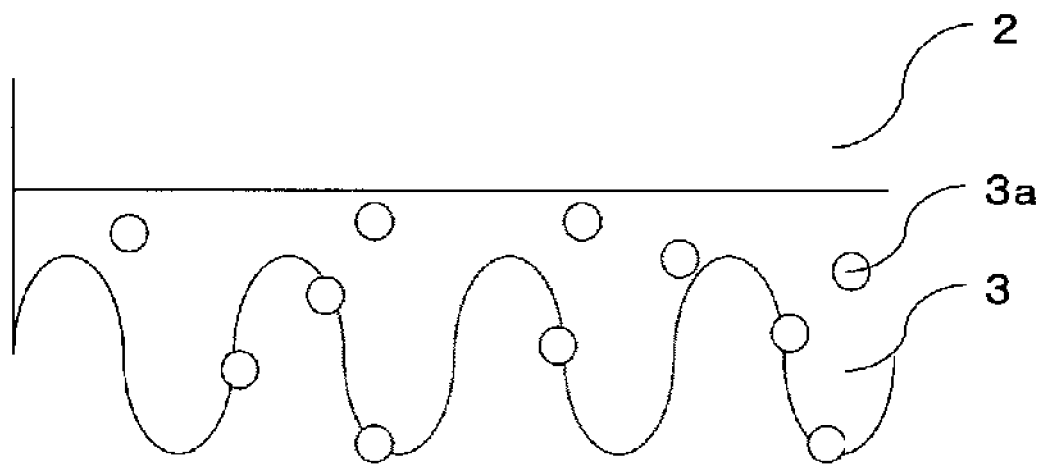
FIG. 2 A partially enlarged view of the transparent electroconductive laminate of the present invention shown in FIG. 1, with respect to the first embodiment of the transparent electroconductive laminate of the present invention.

According to the first embodiment of the transparent electroconductive laminate of the present invention, the cured resin layer 3 having an uneven surface on a surface of the transparent organic polymer substrate 1 contains, as shown in the enlarged view of FIG. 2, metal oxide and/or metal fluoride ultrafine particles 3a having an average primary particle diameter of less than 200 nm, and at least a some of the ultrafine particles 3a are present on the uneven surface of the cured resin layer 3.

Figure 3:
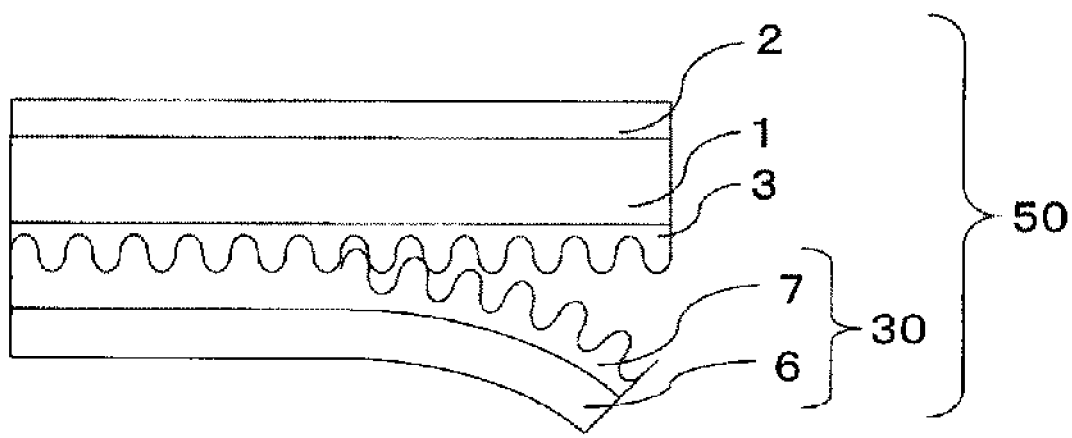
FIG. 3 Another schematic view of the transparent electroconductive laminate of the present invention.

The transparent electroconductive laminate 50 of the present invention illustrated in FIG. 3 further has a temporary surface protective film 30 laminated on the uneven surface of the cured resin layer 3, as well as the configuration (1, 2, 3) of the transparent electroconductive laminate 10 of the present invention illustrated in FIG. 1. The temporary surface protective film 30 has a plastic film 6 as the base material and an adhesive layer 7 applied to one surface of the plastic film.

Figure 4:
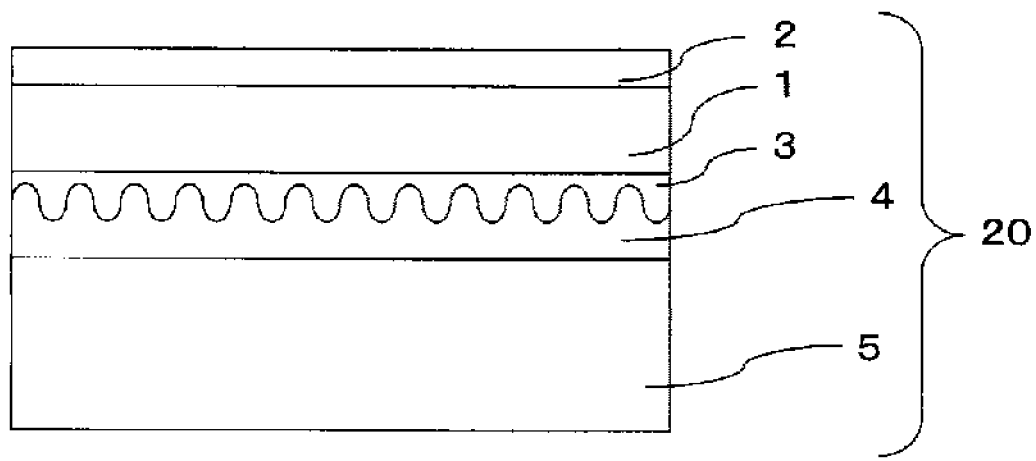
FIG. 4 Still another schematic view of the transparent electroconductive laminate of the present invention.

The transparent electroconductive laminate 20 of the present invention illustrated in FIG. 4 further has an adhesive layer 4 and a second transparent substrate 5 stacked in order on the uneven surface of the cured resin layer 3, as well as the configuration (1, 2, 3) of the transparent electroconductive laminate 10 of the present invention illustrated in FIG. 1.

<Transparent Electroconductive Laminate—Transparent Organic Polymer Substrate>

The transparent organic polymer substrate used in the transparent electroconductive laminate of the present invention may be any transparent polymer substrate, and particularly a transparent organic polymer substrate excellent in heat resistance, transparency and the like, which is used in the optical field.

The transparent organic polymer substrate used in the transparent electroconductive laminate of the present invention includes, for example, a substrate composed of a transparent polymer such as polyester-based polymer (e.g., polyethylene terephthalate, polyethylene naphthalate), polycarbonate-based polymer, cellulose-based polymer (e.g., diacetyl cellulose, triacetyl cellulose), and acrylic polymer (e.g., polymethyl methacrylate). The transparent organic polymer substrate used in the transparent electroconductive laminate of the present invention also includes a substrate composed of a transparent polymer such as styrene-based polymer (e.g., polystyrene, acrylonitrile-styrene copolymer), olefin-based polymer (e.g., polyethylene, polypropylene, polyolefin having a cyclic or norbornene structure, ethylene-propylene copolymer), vinyl chloride-based polymer, and amide-based polymer such as nylon and aromatic polyamide. Other examples of the transparent organic polymer substrate used in the transparent electroconductive laminate of the present invention include a substrate composed of a transparent polymer such as imide-based polymer, sulfone-based polymer, polyethersulfone-based polymer, polyether ether ketone-based polymer, polyphenylene sulfide-based polymer, vinyl alcohol-based polymer, vinylidene chloride-based polymer, vinyl butyral-based polymer, allylate-based polymer, polyoxymethylene-based polymer, epoxy-based polymer, and a blend of these polymers.

In the transparent electroconductive laminate of the present invention, among these transparent organic polymer substrates, those having an optically low birefringence, a birefringence controlled to $\lambda/4$ or $\lambda/2$, or the birefringence not controlled, may be appropriately selected according to usage. An appropriate selection according to usage as described above is performed, when the transparent electroconductive laminate of the present invention is used, for example, as a display member developing its function through polarization such as linear polarization, elliptical polarization and circular polarization, such as a polarizing plate or a retardation film in a liquid crystal display, or in an inner touch panel.

The film thickness of the transparent organic polymer substrate may be appropriately determined, and generally, in view of strength, workability such as handleability and the like, the film thickness is approximately from 10 to 500 µm, preferably from 20 to 300 µm, more preferably from 30 to 200 µm.

<Transparent Electroconductive Laminate—Transparent Electroconductive Layer>

In the transparent electroconductive laminate of the present invention, a transparent electroconductive layer is disposed on one surface of the transparent organic polymer substrate.

In the present invention, the transparent electroconductive layer is not particularly limited, and includes, for example, a crystalline metal layer and a crystalline metal compound layer. As for the component constituting the transparent electroconductive layer, the layer is composed of, for example, a metal oxide such as silicon oxide, aluminum oxide, titanium oxide, magnesium oxide, zinc oxide, indium oxide and tin oxide. A crystalline layer composed of indium oxide as a main component is preferred, and a layer composed of crystalline ITO (indium tin oxide) is more preferably used.

Also, in the case where the transparent electroconductive layer is formed of a crystalline material, the upper limit of the crystal grain size need not be specifically set, and is preferably 3,000 nm or less. If the crystal grain size exceeds 3,000 nm, writing durability is disadvantageously impaired. The crystal grain size as used herein is defined as a maximum diagonal or diameter out of diagonals or diameters in respective polygonal or oval regions observed through a transmission electron microscope (TEM).

In the case where the transparent electroconductive layer is not a crystalline film, sliding durability or environmental reliability required for a touch panel may be deteriorated.

The transparent electroconductive layer can be formed by a known technique, and, for example, a physical vapor deposition (hereinafter, referred to as "PVD") method such as DC magnetron sputtering method, RF magnetron sputtering method, ion plating method, vapor deposition method and pulsed laser deposition method may be used. From the standpoint of industrial productivity in forming a metal compound layer having a uniform thickness on a large area, a DC magnetron sputtering method is preferred. Incidentally, other than the above-described physical vapor deposition (PVD) method, a chemical formation method such as chemical vapor deposition (hereinafter, referred to as "CVD") method and sol-gel method may be used. In view of thickness control, a sputtering method is preferred.

In view of transparency and electrical conductivity, the film thickness of the transparent electroconductive layer is preferably from 5 to 50 nm, more preferably from 5 to 30 nm. If the film thickness of the transparent electroconductive layer is less than 5 nm, the aging stability of the resistance value tends to be poor, whereas if it exceeds 50 nm, the surface resistance value lowers and this is not preferred for a touch panel.

In the case of using the transparent electroconductive laminate of the present invention for a touch panel, from the standpoint of, for example, reducing the power consumption of the touch panel and necessarily experiencing a circuit processing, it is preferred to use a transparent electroconductive layer having a surface resistance value of 100 to 2,000 Ω/sq, more preferably from 140 to 1,000 Ω/sq, and the transparent electroconductive layer film thickness of from 10 to 30 nm.

<Transparent Electroconductive Laminate—Cured Resin Layer Having Uneven Surface>

In the transparent electroconductive laminate of the present invention, a cured resin layer having an uneven surface is disposed on a surface of the transparent organic polymer substrate, on the side opposite to the transparent electroconductive layer. The cured resin layer has an uneven surface formed from a coating composition containing at least two components which undergo phase separation due to the difference in physical properties thereof.

In the transparent electroconductive laminate of the present invention, the uneven surface of the cured resin layer is formed from a coating composition containing at least two components which undergo phase separation due to the difference in physical properties thereof, so that a transparent electroconductive laminate capable of achieving good transparency or haze characteristics can be provided, when an adhesive layer and a second transparent substrate are stacked in order on the uneven surface of the cured resin layer.

<Transparent Electroconductive Laminate—Cured Resin Layer having Uneven Surface—First Embodiment>

In the first embodiment of the transparent electroconductive laminate of the present invention, the cured resin layer does not contain inorganic and/or organic fine particles having an average primary particle diameter of 200 nm or more, the cured resin layer contains metal oxide and/or metal fluoride ultrafine particles having an average primary particle diameter of less than 200 nm, and the amount of the ultrafine particles contained in the cured resin layer is from 0.01 to 7.5 parts by mass per 100 parts by mass of the cured resin component.

In the first embodiment of the transparent electroconductive laminate of the present invention, the uneven surface of the cured resin layer is formed from a coating composition containing at least two components which undergo phase separation due to the difference in physical properties thereof. Further, the cured resin layer does not contain inorganic and/or organic fine particles having an average primary particle diameter of 200 nm or more, particularly 150 nm or more, more particularly 100 nm or more, in other words, does not contain inorganic and/or organic fine particles conventionally used for forming an uneven surface, etc. Therefore, a transparent electroconductive laminate can achieve good transparency or haze characteristics, when an adhesive layer and a second transparent substrate are stacked in order on the uneven surface of the cured resin layer. That is, according to the first embodiment of the transparent electroconductive laminate of the present invention, the cured resin layer having an uneven surface is presented from forming a haze due to the presence of inorganic and/or organic fine particles.

This is because a substance having a size of ¼ or less of the wavelength of the objective light generally behaves as optically transparent. That is, for example, a substance having a size of less than 150 nm behaves as optically transparent to visible light of 600 nm. However, this phenomena also depends on the density, the degree of dispersion, and the like of the substance, and does not mean that a substance having the above size always behaves as a completely transparent substance.

The expression "does not contain inorganic and/or organic fine particles having an average primary particle diameter of 200 nm or more" as used in the present invention means that inorganic and/or organic fine particles having such an average primary particle diameter are not intentionally added.

In the first embodiment of the transparent electroconductive laminate of the present invention, the cured resin layer contains metal oxide and/or metal fluoride ultrafine particles having an average primary particle diameter of less than 200 nm. Ultrafine particles having the above particle size do not significantly contribute to the formation of unevenness on the surface of the cured resin layer. However, their presence on the surface of the cured resin layer affects the peel-off force for separating the temporary surface protective film from the cured resin layer, whereby the peel-off force can be adjusted to the same value as that for a lubricating layer composed of a conventional cured resin layer which is formed of a binder and inorganic particles and/or organic particles having an average primary particle diameter of 200 nm or more.

In the first embodiment of the transparent electroconductive laminate of the present invention, by the uneven surface formed of a coating composition containing at least two components which undergo phase separation due to the difference in physical properties, a preferred lubricity for handleability and preferred optical characteristics can be provided to the transparent electroconductive laminate. In particular, the arithmetic average roughness (Ra) of the uneven surface of the cured resin layer is from 5 nm to less than 500 nm, and the ten-point average roughness (Rz) of the uneven surface of the cured resin layer is from 50 nm to less than 2,000 nm, whereby more preferred lubricity for handleability and more preferred optical characteristics can be provided to the transparent electroconductive laminate.

The arithmetic average roughness (Ra) of the uneven surface of the cured resin layer and the ten-point average roughness (Rz) of the uneven surface of the cured resin layer can be adjusted to fall in the ranges above by controlling, for example, the SP values, and quantitative ratios of at least two components which undergo phase separation, the kinds and quantitative ratios of the metal oxide and/or metal fluoride ultrafine particles having an average primary particle diameter of less than 200 nm, the kind and quantitative ratio of the solvent used, the temperature during drying, the drying time, the curing conditions, and the film thickness after curing.

In order to provide sufficient lubricity, it is preferred that the arithmetic average roughness (Ra) of the uneven surface of the cured resin layer is 5 nm or more, and that the ten-point average roughness (Rz) of the uneven surface of the cured resin layer is 50 nm or more. Also, in order to present haze increase or sparkling of the transparent electroconductive laminate, it is preferred that the arithmetic average roughness (Ra) of the uneven surface of the cured resin layer is less than 500 nm, and that the ten-point average roughness (Rz) of the uneven surface is less than 2,000 nm. Particularly, in the case where the transparent electroconductive laminate obtained by stacking an adhesive layer and a transparent substrate on the cured resin layer having an uneven surface has small haze, it is important that the haze increase or sparkling attributable to the cured resin layer having an uneven surface is small.

The arithmetic average roughness (Ra) is preferably from 5 nm to less than 400 nm, more preferably from 5 nm to less than 300 nm, still more preferably from 5 nm to 200 nm, yet still more preferably from 10 nm to less than 200 nm.

Incidentally, in the present invention, the arithmetic average roughness (centerline average roughness) (Ra) is the roughness defined in accordance with JIS B0601-1994. More specifically, a portion of a reference length L is extracted from a roughness curve in a centerline direction thereof, the centerline of the extracted portion is taken as axis X, the axial magnification direction is taken as axis Y, the roughness curve is represented by y=f(x), and on these conditions, the arithmetic average roughness (Ra) is represented by the following formula:

$$R_a = \frac{1}{L}\int_0^L |f(x)|dx$$

The ten-point average roughness (Rz) is preferably from 50 nm to less than 1,500 nm, more preferably from 50 nm to less than 1,000 nm, still more preferably from 70 nm to less than 800 nm, yet still more preferably from 100 nm to less than 500 nm.

Incidentally, in the present invention, the ten-point average roughness (Rz) is the roughness defined in accordance with JIS B0601-1982. More specifically, the ten-point average roughness (Rz) is a value determined by an analog-type surface roughness meter, and this is a value defined as the sum of an average height of the highest to the fifth highest peaks and an average depth of the deepest to the fifth deepest valleys, in the cross-sectional curve (as-measured data) of a reference length. The reference length is 0.25 mm.

(Metal Oxide and/or Metal Fluoride Ultrafine Particles Having an Average Primary Particle Diameter of Less than 200 nm, which are Contained in the Cured Resin Layer Having an Uneven Surface)

The kind of the metal oxide and/or metal fluoride ultrafine particles having an average primary particle diameter of less than 200 nm, which are contained in the cured resin layer having an uneven surface of the first embodiment of the transparent electroconductive laminate of the present invention, is not limited. The metal oxide and/or metal fluoride ultrafine particles may have an average primary particle diameter of, for example, less than 150 nm, less than 100 nm, less than 90 nm, less than 80 nm, less than 70 nm, or less than 60 nm, depending on the intended magnitude of the peel-off force of the temporary surface protective film, the haze characteristics of the transparent electroconductive laminate, or the like.

As the metal oxide and/or metal fluoride ultrafine particles, at least one member selected from the group consisting of $MgF_2$, $Al_2O_3$, $Bi_2O_3$, $CeO_2$, $In_2O_3$, $In_2O_3 \cdot SnO_2$, $HfO_2$, $La_2O_3$, $Sb_2O_5$, $Sb_2O_5 \cdot SnO_2$, $SiO_2$, $SnO_2$, $TiO_2$, $Y_2O_3$, $ZnO$ and $ZrO_2$ may be suitably used. Particularly, $MgF_2$, $Al_2O_3$ and $SiO_2$ may be used, and more particularly, $MgF_2$ may be used.

In the first embodiment of the transparent electroconductive laminate of the present invention, in order to provide a preferred property in terms of transparency or haze characteristics, the ultrafine particles contained in the cured resin layer are preferably dispersed in a substantially homogeneous manner, and in particular, it is preferred that a secondary aggregate or secondary particle larger than an optical wavelength is not formed.

The peelability of the temporary surface protective film can be adjusted to a desired level by controlling the amount of ultrafine particles contained in the cured resin layer. Also, the amount of ultrafine particles can be determined within the range not impairing the lubricity, in the first embodiment of the transparent electroconductive laminate of the present invention. This is because, if the amount of ultrafine particles is excessively large, the phase separation state of two components forming the unevenness of the cured resin layer is changed, and desired lubricity may not be obtained.

Specifically, the amount of ultrafine particles contained in the cured resin layer may be from 0.1 to 7.5 parts by mass, for example, from 1 to 5 parts by mass.

(First and Second Components Constituting the Cured Resin Layer Having an Uneven Surface)

As for the coating composition containing materials constituting the cured resin layer having an uneven surface, i.e., at least two components which undergo phase separation due to the difference in physical properties, International Patent Publication No. WO2005/073763 may be referred to.

For example, as described in International Patent Publication No. WO2005/073763, when the coating composition is coated on a transparent organic polymer substrate to form a cured resin layer, the first and second components contained in the coating composition undergo phase separation due to the difference in physical properties of the first and second components, whereby a resin layer having a random unevenness on the surface is formed. Specific first and second components contained in the coating composition can be independently selected from the group consisting of monomers, oligomers and resins.

In order to allow the first component and the second component to undergo phase separation due to the difference in physical properties of the first and second components, the difference in the value of a specific physical property between the first and second components, for example, the difference in the value such as SP value (solubility parameter), glass transition temperature (Tg), surface tension and/or number average molecular weight, can be a given magnitude. The first and second components contained in the coating composition may be used in a ratio of 1:99 to 99:1, preferably from 1:99 to 50:50, more preferably from 1:99 to 20:80.

(First and Second Components Constituting the Cured Resin Layer Having an Uneven Surface—SP Value)

In the case where phase separation of the first component from the second component is brought about by the difference in the SP value (solubility parameter), the difference between the SP value of the first component and the SP value of the second component is preferably 0.5 or more, more preferably 0.8 or more. The upper limit of the difference in the SP value is not particularly limited, and is generally 15 or less. When the difference between the SP value of the first component and the SP value of the second component is 0.5 or more, compatibility between respective resins is low, and in turn, phase separation of the first component from the second component may occur after the applying the coating composition to a substrate.

Incidentally, as for the SP value, a larger numerical value indicates higher polarity, and a smaller numerical value indicates lower polarity. In the present invention, the SP value is measured by the method described in SUH, CLARKE, *J.P.S. A*-1, 5, 1671-1681 (1967), and International Patent Publication No. WO2005/073763 citing the publication above.

As an example of the first and second components, the first component may be an oligomer or a resin, and the second component may be a monomer. The oligomer or resin as the first component is preferably an unsaturated double bond-containing acrylic copolymer, and the monomer as the second component is preferably a polyfunctional unsaturated double bond-containing monomer. The term "oligomer" as used in the description of the present invention indicates a polymer having from 3 to 10 repeating units.

As another example, the first and second components both are an oligomer or a resin. The first and second components are preferably a resin containing a (meth)acrylic resin in the framework structure. The first component is more preferably an unsaturated double bond-containing acrylic copolymer, and the second component is more preferably a polyfunctional unsaturated double bond-containing monomer.

The coating composition for the cured resin layer of the present invention may further contain an organic solvent. Preferred examples of the organic solvent include a ketone-based solvent, such as methyl ethyl ketone, an alcohol-based solvent such as methanol, and an ether-based solvent such as anisole. One of these solvents may be used alone, or two or more kinds of organic solvents may be mixed and used.

(First and Second Components Constituting the Cured Resin Layer Having an Uneven Surface—Glass Transition Temperature (Tg))

In the case where phase separation of the first component from the second component is brought about by the difference in the glass transition temperature (Tg), it is preferred that either one of the first and second components has Tg lower than the ambient temperature at the coating of the composition, and the other has Tg higher than the ambient temperature at the coating of the composition. In this case, the resin having Tg higher than the ambient temperature is in a glassy state at that ambient temperature to inhibit its molecular motion, and therefore the resin aggregates in the coating composition after coating, whereby phase separation of the first component from the second component occurs.

(First and Second Components Constituting the Cured Resin Layer Having an Uneven Surface—Surface Tension)

In the case where phase separation of the first component from the second component is brought about by the difference in the surface tension, the difference between the surface tension of the first component and the surface tension of the second component is preferably from 1 to 70 dyn/cm, and this difference is more preferably from 5 to 30 dyn/cm. When the difference in the surface tension is in this range, the resin having a higher surface tension tends to aggregate, and in turn, phase separation of the first component from the second component occurs after the application of the coating composition.

Incidentally, the surface tension can be determined by measuring the static surface tension by a ring method using Dynometer manufactured by Byk Chemie.

(Components Other than First and Second Components Constituting the Cured Resin Layer Having an Uneven Surface)

In the coating composition for the cured resin layer having an uneven surface, a resin usually used may be contained, in addition to the above-described first and second components. The coating composition for the cured resin layer having an uneven surface is prepared by mixing the first component and the second component together with, if desired, a solvent, a catalyst and a curing agent.

The solvent in the coating composition for the cured resin layer having an uneven surface is not particularly limited, and is appropriately selected by taking into consideration, for example, the first and second components, the material of a base part for coating, and the method for coating the composition. Specific examples of the solvent used include an aromatic solvent such as toluene; a ketone-based solvent such as methyl ethyl ketone; an ether-based solvent such as diethyl ether; an ester-based solvent such as ethyl acetate; an amide-based solvent such as dimethylformamide; a cellosolve-based solvent such as methyl cellosolve; an alcohol-based solvent such as methanol; and a halogen-based solvent such as dichloromethane. One of these solvents may be used alone, or two or more thereof may be used in combination.

<Transparent Electroconductive Laminate—Cured Resin Layer having Uneven Surface—Second Embodiment>

In the second embodiment of the transparent electroconductive laminate of the present invention, the cured resin layer does not contain inorganic and/or organic fine particles for forming an uneven surface. Also, the arithmetic average roughness (Ra) of the uneven surface of the cured resin layer is from 10 nm to less than 500 nm, and at the same time, the ten-point average roughness (Rz) of the uneven surface of the cured rein layer is from 100 nm to less than 2,000 nm.

In the second embodiment of the transparent electroconductive laminate of the present invention, the uneven surface of the cured resin layer is formed from a coating composition containing at least two components which undergo phase separation due to the difference in physical properties thereof, and at the same time, the cured resin layer does not contain inorganic and/or organic fine particles for forming the uneven surface. Therefore, when an adhesive layer and a second transparent substrate are stacked in order on the uneven surface of the cured resin layer, a transparent electroconductive laminate can achieve good transparency or haze characteristics. That is, according to the second embodiment of the transparent electroconductive laminate of the present invention, the cured resin layer having an uneven surface is prevented from haze formation due to inorganic and/or organic fine particles.

Also, according to the second embodiment of the transparent electroconductive laminate of the present invention, when the arithmetic average roughness (Ra) of the uneven surface of the cured resin layer is from 5 nm to less than 500 nm, and at the same time, the ten-point average roughness (Rz) of the uneven surface of the cured rein layer is from 50 nm to less than 2,000 nm, preferred lubricity for handleability can be provided. The arithmetic average roughness (Ra) of the uneven surface of the cured resin layer and the ten-point average roughness (Rz) of the uneven surface of the cured resin layer can be adjusted to satisfy the ranges above by controlling, for example, the SP values and quantitative ratios of at least two components undergoing phase separation, the kind and amount of the solvent used, the temperature during drying, the drying time, the curing conditions, and the film thickness after curing.

With respect to, for example, the size of inorganic and/or organic fine particles for forming the uneven surface, the preferred arithmetic average roughness (Ra) and ten-point average roughness (Rz), the first and second components constituting the cured resin layer having an uneven surface, and the components other than the first and second components constituting the cured resin layer having an uneven surface, those described for the first embodiment of the transparent electroconductive laminate of the present invention may be referred to.

<Transparent Electroconductive Laminate—Temporary Surface Protective Film>

The transparent electroconductive laminate of the present invention may further have a temporary surface protective film laminated on the uneven surface of the cured resin layer. The temporary surface protective film generally comprises a plastic film as the base material, and an adhesive layer provided on one surface of the base material. The temporary surface protective film is used for protecting the electroconductive laminate of the present invention during transportation, storage, processing and the like by laminating on the uneven surface of the cured resin layer of the transparent electroconductive laminate of the present invention, and thereafter is separated and removed.

According to the first embodiment of the transparent electroconductive laminate of the present invention, it is possible to use the same temporary surface protective film as those used in a transparent electroconductive laminate having a conventional lubricating layer, i.e. the same temporary surface protective film as those used in a transparent electroconductive laminate having a conventional lubricating layer formed of a binder and inorganic particles and/or organic particles having an average primary particle diameter of 200 nm or more. Further, at the same time, it is possible to separate the temporary surface protective film in the same manner as in the case of separating a temporary surface protective film from a transparent electroconductive laminate having a conventional lubricating layer.

As the base material of the temporary surface protective film, it is generally possible to use a transparent olefin-based film, such as polyethylene and polypropylene-based films, or a polyester-based film such as polyethylene terephthalate and polycarbonate-based films. The surface protective film may have either a single-layer structure or a multilayer structure. In the case of a multilayer structure, a multilayer structure consisting of any number of layers may be formed, for example, by co-extrusion. The protective film surface may be also subjected to a lubricating treatment such as emboss processing.

The adhesive layer of the temporary surface protective film is composed of an adhesive. The adhesive layer is formed on one surface of a base material film so as to laminate and fix the base material film of the temporary surface protective film on the transparent electroconductive laminate of the present invention. The adhesive which can be used may be appropriately selected from general adhesives such as ethylene vinyl acetate copolymer (EVA) type adhesive, special polyolefin type adhesive, and acrylic type adhesive. Generally, considering that the laminate is used indoors or outdoors, and various rays, particularly ultraviolet rays, are used at the inspection, use of an acrylic adhesive is preferred, although the present invention is not limited thereto.

Incidentally, with respect to the temporary surface protective film, for example, Japanese Unexamined Patent Publication No. 2005-66919 may be referred to.

<Transparent Electroconductive Laminate—Adhesive Layer and Second Transparent Substrate>

The transparent electroconductive laminate of the present invention may further have an adhesive layer and a second transparent substrate stacked in order on the uneven surface of the cured resin layer. The adhesive layer and the second transparent substrate of the transparent electroconductive laminate of the present invention may be any adhesive layer and any second transparent substrate, and particularly any adhesive layer and any second transparent substrate used for optical applications.

The adhesive layer and the second transparent substrate can be selected according to usage of the transparent electroconductive laminate of the present invention. That is, in applications requiring high transparency of the transparent electroconductive laminate of the present invention as a whole, it is preferable to use a high-transparency adhesive layer and a high-transparency second transparent substrate.

<Transparent Electroconductive Laminate—Adhesive Layer and Second Transparent Substrate—Adhesive Layer>

The material constituting the adhesive layer includes known pressure-sensitive adhesives, and curable resins such as a thermosetting resin and a radiation-curable resin (such as ultraviolet-curable resin). Among these, an acrylic pressure-sensitive adhesive is preferably used.

Incidentally, it is preferred that the refractive index of the cured resin layer having an uneven surface and the refractive index of the adhesive layer are substantially the same as each other. Because, when the values of these refractive indexes are substantially the same, it is possible to prevent reflection, scattering and the like of light at the interface between the cured resin layer and the adhesive layer. The expression "the refractive indexes are substantially the same as each other" as used herein means that the difference in the average refractive index is 0.05 or less, particularly 0.03 or less, more particularly 0.02 or less, still more particularly 0.01 or less, yet Still more particularly 0.005 or less, and most particularly 0.002 or less. The average refractive index as used herein is a value measured, for example, by an Abbe refractometer (Abbe Refractometer 2-T, trade name, manufactured by Atago Co., Ltd.).

<Transparent Electroconductive Laminate—Adhesive Layer and Second Transparent Substrate—Second Transparent Substrate>

As the second transparent substrate, a transparent plastic film, a transparent plastic plate, a glass plate or the like can be used. As for the material of the transparent plastic film or plate, the transparent substrate includes, for example, a substrate composed of a transparent polymer such as polyester-based polymer (e.g., polyethylene terephthalate, polyethylene naphthalate (PET)), polycarbonate-based polymer, cellulose-based polymer (e.g., diacetyl cellulose, triacetyl cellulose (TAC), acetate butyrate cellulose), and acrylic polymer (e.g., polymethyl methacrylate). The transparent substrate also includes a substrate composed of a transparent polymer such as styrene-based polymer (e.g., polystyrene, acrylonitrile.styrene copolymer), olefin-based polymer (e.g., polyethylene, polypropylene, polyolefin having a cyclic or norbornene structure, ethylene.propylene copolymer), vinyl chloride-based polymer, and amide-based polymer such as nylon and aromatic amide. Other examples of the transparent substrate include a substrate composed of a transparent polymer such as imide-based polymer, sulfone-based polymer, polyethersulfone-based polymer, polyether ether ketone-based polymer, polyphenylene sulfide-based polymer, vinyl alcohol-based polymer, vinylidene chloride-based polymer, vinyl butyral-based polymer, allylate-based polymer, polyoxymethylene-based polymer, epoxy-based polymer, and a blend of these polymers.

As for the specific material and thickness of the second transparent substrate of the transparent electroconductive laminate of the present invention, the transparent substrate may have any thickness, depending on the usage of the transparent electroconductive laminate. For example, in the case of using the transparent electroconductive laminate of the present invention as a movable electrode substrate of a transparent touch panel, in view of flexibility for moving the movable electrode substrate as a switch and strength for keeping the flatness, a transparent plastic film may be used as the second transparent substrate, and the thickness of the entire transparent electroconductive laminate comprising an adhesive layer and a second transparent substrate may be from 50 to 400 μm. Also, in the case of using the transparent electroconductive laminate of the present invention as a fixed electrode substrate of a transparent touch panel, in view of strength for maintaining flatness, a transparent glass plate or a transparent plastic plate may be used as the second transparent substrate, and the thickness of the entire transparent electroconductive laminate comprising an adhesive layer and a second transparent substrate may be from 0.2 to 4.0 mm.

<Transparent Electroconductive Laminate—Other Layers>

The transparent electroconductive laminate of the present invention may have a layer such as adhesive layer, hard layer and optical interference layer, between and/or on respective layers constituting the transparent electroconductive laminate of the present invention, for example, between the transparent organic polymer substrate and the cured resin layer having an uneven surface, and/or between the transparent organic polymer substrate and the transparent electroconductive layer, and/or on the cured resin layer having an uneven surface, and/or on the transparent electroconductive layer, as long as it does not impair the purpose of the present invention.

For example, the cured resin layer having an uneven surface is stacked on the transparent organic polymer substrate, directly or via an appropriate anchor layer. Preferred examples of the anchor layer include a layer enhancing adherence of the cured resin layer having an uneven surface to the transparent organic polymer substrate, a layer preventing permeation of moisture or air, a layer absorbing moisture or air, a layer absorbing ultraviolet ray or infrared ray, and a layer reducing antistatic property of the substrate.

<Transparent Electroconductive Laminate—Haze>

As described above, by the cured resin layer having an uneven surface, the transparent electroconductive laminate of the present invention can achieve good transparency or haze characteristics when an adhesive layer and a second transparent substrate are stacked in order on the uneven surface of the cured layer, while having preferred lubricity for handleability.

In this case, the haze characteristics are, for example, such that the transparent electroconductive laminate satisfies the following relationship, assuming that the same transparent electroconductive laminate as the transparent electroconductive laminate of the present invention except for having a haze-free reference cured resin layer in place of the cured resin layer having an uneven surface is a reference transparent electroconductive laminate:

$-0.1 < H1 - H2 < 1.0$, preferably $-0.1 < H1 - H2 < 0.5$, more preferably $-0.1 < H1 - H2 < 0.3$, still more preferably $-0.1 < H1 - H2 < 0.1$ (wherein H1: the haze value (%) of the transparent electroconductive laminate which has a adhesive layer and a second transparent substrate stacked in order on the uneven surface of the cured resin layer having an uneven surface, and H2: the haze value (%) of the reference transparent electroconductive laminate which has the adhesive layer and the second transparent substrate stacked in order on the surface of the reference cured resin layer).

The term "haze-free reference cured resin layer" of the reference transparent electroconductive laminate means a cured resin layer having substantially no internal haze, and can be defined, for example, as a cured resin layer having the measured internal haze of less than 0.1.

A small value of the difference (H1−H2) means that, when an adhesive layer and a second transparent substrate are stacked in order on the uneven surface of the cured resin layer of the transparent electroconductive laminate of the present invention, transparency or haze characteristics can be equivalent to those of a corresponding transparent electroconductive laminate having no lubricating layer (i.e., the reference transparent electroconductive laminate) That is, good transparency or haze characteristics can be achieved.

In the present invention, the haze is the haze defined in accordance with JIS K7136. Specifically, the haze is a value defined as the ratio of the diffuse transmittance $\tau_d$ to the total light transmittance $\tau_t$, and more specifically, can be determined according to the following formula:

$$\text{Haze}(\%) = [(\tau_4/\tau_2) - \tau_3(\tau_2/\tau_1)] \times 100$$

wherein $\tau_1$: the luminous flux of incident light, $\tau_2$: the total luminous flux transmitted through the test piece, $\tau_3$: the luminous flux diffused in the apparatus, and $\tau_4$: the luminous flux diffused in the apparatus and the test piece.

<Transparent Touch Panel>

In the transparent touch of the present invention, two transparent electrode substrates each having a transparent electroconductive layer on at least one surface are disposed by arranging respective transparent electroconductive layers to face each other, and at least one of these two transparent electrode substrates has the transparent electroconductive laminate of the present invention.

FIG. 5 shows an example of the transparent touch panel of the present invention. The transparent touch panel 100 of the present invention illustrated in FIG. 5 has a fixed electrode substrate 20', a movable electrode substrate 20", and a dot spacer 9 between these electrodes.

The space between the movable electrode substrate 20" and the fixed electrode substrate 20' is set to a distance of usually from 10 to 100 μm by using the dot spacer 9. When the surface of the movable electrode substrate 20" is pressed by a finger or a pen, the movable electrode substrate 20" and the fixed electrode substrate 20' are electrically contacted at the pressed position, whereby the input position can be detected as a potential difference. The dot spacer 9 is provided to enable input by a finger or a pen, while preventing the movable electrode substrate 20' from sagging under the natural force and coming into contact with the fixed electrode substrate 20". However, the dot spacer 9 is not essential.

The transparent touch panel of the present invention can be installed in a liquid crystal display device. In this case, for example, in the transparent touch panel 100 of the present invention shown in FIG. 5, one of glass substrates sandwiching a liquid crystal layer of the liquid crystal display device can be used as the second transparent substrate 5' of the fixed electrode substrate 20' side.

Incidentally, the fixed electrode substrate 20' comprises a transparent organic polymer substrate 1', a transparent electroconductive layer 2' on one surface of the transparent organic polymer substrate, a cured resin layer 3' having an uneven surface on another surface of the transparent organic polymer substrate, as well as a adhesive layer 4' and a second transparent substrate 5' such as glass plate, which are stacked in order on the uneven surface of the cured resin layer. Also, the movable electrode substrate 20" comprises a transparent organic polymer substrate 1", a transparent electroconductive layer 2" on one surface of the transparent organic polymer substrate, a cured resin layer 3" having an uneven surface on another surface of the transparent organic polymer substrate, as well as a adhesive layer 4" and a second transparent substrate 5", such as plastic film, which are stacked in order on the uneven surface of the cured resin layer.

EXAMPLES

The present invention is described in greater detail below by referring to Examples, although the present invention is not limited to these Examples. In the Examples, unless otherwise indicated, the "parts" and "%" are on the mass basis. Also, various measurements in Examples were performed as follows.

<Ra (Arithmetic Average Roughness)>
This was measured using a stylus profilometer, DEKTAK 3, manufactured by Sloan. The measurement was performed in accordance with JIS B0601-1994.

<Rz (Ten-Point Average Roughness)>
This was measured using Surfcorder SE-3400 manufacture by Kosaka Laboratory Ltd. The measurement was performed in accordance with JIS B0601-1982.

<Thickness>
The measurement was performed using a stylus thickness meter, Alpha Steck, manufactured by Anritsu Electric Co., Ltd.

<Haze>
This was measured using a haze meter (MDH2000) manufactured by Nippon Denshoku Industries Co., Ltd.

<Contact Angle>
A plate-formed sample piece was horizontally placed, with the cured resin layer surface up, and a drop of water was dropped thereon by using a 1 ml-volume syringe in accordance with the sessile drop method of JIS R3257, thereby allowing from 1 to 4 μl of a droplet to stand still on the sample piece. Subsequently, after standing for one minute, the contact angle θ of water was read using a microscope equipped with an angle finder.

<Peel-Off Force>
The transparent electroconductive laminate was fixed on an acrylic plate, and the peel-off force of the protective film was measured using a tensile tester (55R4302) manufactured by Instron Japan Co., Ltd. under the following conditions.
Peel-off angle: 180°
Peeling-off speed: 300 mm/min
Sample width: 30 mm <Lubricity>
The lubricity of the cured resin layer was evaluated by a sensory test based on whether the lubricity is good (A) or bad (B).

Examples A1 to A4

Reference Example A1 and Comparative Examples A1 and A2

Each of transparent electroconductive laminates of Examples A1 to A4, Reference Example A1 and Comparative Examples A1 and A2 was configured as shown in FIG. 3, and tested for the peel-off force for separating the temporary surface protective film. Also, each of these transparent electroconductive laminates was configured as shown in FIG. 4, and measured for the haze value of the transparent electroconductive laminate before and after stacking the adhesive layer and the second transparent substrate. The results are shown in Table 1 below. Specifically, these transparent electroconductive laminates were produced as follows.

Example A1

Formation of Cured Resin Layer

The transparent electroconductive laminate of Example A1 was produced as follows. That is, the following Coating Solution $R_A$ was coated by a bar coating method on one surface of a 100 μm-thick carbonate (PC) film (C110, produced by Teijin Chemicals, Ltd.) (first transparent substrate, haze value: 0.11%), dried at 30° C. for 1 minute, and then cured through irradiation with ultraviolet ray to be a cured resin layer having a thickness of 3.0 μm and a refractive index of 1.50.

Coating Solution $R_A$ was prepared by dissolving, in an isobutyl alcohol solvent, 4.5 parts by weight of an unsaturated double bond-containing acrylic copolymer (Sp value: 10.0, Tg: 92° C.) as the first component constituting the cured resin layer having an uneven surface, 100 parts by weight of pentaerythritol triacrylate (Sp value: 12.7) as the second component constituting the cured resin layer having an uneven surface, 10 parts by mass of a dispersion liquid of metal fluoride ultrafine particle (2 parts by mass in terms of solid content, produced by C. I. Kasei Company, Limited, a 20 mass % isopropyl alcohol dispersion liquid of $MgF_2$ ultrafine particle, average primary particle diameter of ultrafine particle: 50 nm), and 7 parts by weight of Irgacure 184

(produced by Ciba Specialty Chemicals Corp.) as a photopolymerization initiator; and thereby had a solid content of 30 wt %.

Incidentally, the unsaturated double bond-containing acrylic copolymer (Sp value: 10.0, Tg: 92° C.) as the first component was prepared as follows.

A mixture consisting of 171.6 g of isoboronyl methacrylate, 2.6 g of methyl methacrylate and 9.2 g of methylacrylic acid was mixed; and this mixed solution was added dropwise to 330.0 g of propylene glycol monomethyl ether heated to 110° C. under a nitrogen atmosphere in a 1,000 ml-volume reaction vessel equipped with a stirring blade, a nitrogen inlet tube, a condenser and a dropping funnel, simultaneously with 80.0 g of a propylene glycol monomethyl ether solution containing 1.8 g of tertiary butylperoxy-2-ethylhexanoate, at a constant speed over 3 hours. Thereafter, the reaction was allowed to proceed at 110° C. for 30 minutes.

Subsequently, 17.0 g of a propylene glycol monomethyl ether solution containing 0.2 g of tertiary butylperoxy-2-ethylhexanoate was added dropwise, 5.0 g of a propylene glycol monomethyl ether solution containing 1.4 g of tetrabutylammonium bromide and 0.1 g of hydroquinone was added thereto, a solution containing 22.4 g of 4-hydroxybutyl acrylate glycidyl ether and 5.0 g of propylene glycol monomethyl ether was added dropwise over 2 hours with air bubbling; and the reaction was further allowed to proceed over 5 hours to obtain an unsaturated double bond-containing acrylic copolymer as the first component.

The unsaturated double bond-containing acrylic copolymer obtained had a number average molecular weight of 5,500, a weight average molecular weight of 18,000, a Sp value of 10.0, Tg of 92° C., and a surface tension of 31 dyn/cm.

(Formation of ITO Layer)

Transparent Electroconductive Layer-1 (ITO layer) was then formed on the other surface than the surface having the cured resin layer formed thereon, by a sputtering method using an indium oxide-tin oxide target having a composition of indium oxide and tin oxide in a weight ratio of 95:5 and having a filling density of 98%. The thickness of the ITO layer was about 20 nm, and the surface resistance value was about 350 Ω/sq.

(Measurement of Peel-Off Force)

A protective film (PAC-2-70, produced by Sun A. Kaken Co., Ltd.) was attached by pressure on the cured resin layer at room temperature and heat-treated at 130° C. for 90 minutes. Thereafter, the peel-off force (adhesion strength) of the protective film was measured by separating the protective film.

(Fabrication of Transparent Electroconductive Laminate)

Also, an acrylic pressure-sensitive adhesive (refractive index: 1.50) and a 100 μm-thick polycarbonate (PC) film (C110, produced by Teijin Chemicals, Ltd., haze value: 0.11%) (second transparent substrate) were laminated in order on the cured resin layer to obtain a transparent electroconductive laminate.

The characteristics of the produced transparent electroconductive laminate are shown in Table 1.

Example A2

A transparent electroconductive laminate was obtained in the same manner as in Example A1, except for changing the amount used of the dispersion liquid of metal fluorine ultrafine particle of Example A1 to 25 parts by mass (5 parts by mass in terms of solid content, produced by C. I. Kasei Company, Limited, $MgF_2$ ultrafine particle: 20 mass %, a dispersion in isopropyl alcohol, average primary particle diameter of ultrafine particle: 50 nm). The characteristics of the produced transparent electroconductive laminate are shown in Table 1. Incidentally, the refractive index of the obtained cured resin layer was 1.50.

Example A3

A transparent electroconductive laminate was obtained in the same manner as in Example A1, except for using a 188 μm-thick polyethylene terephthalate (PET) film (OFW, produced by Teijin DuPont Films Japan Limited, haze value: 0.73%) in place of Transparent Substrate A of Example A1, and changing the drying temperature of Coating Solution R to 50° C. The characteristics of the produced transparent electroconductive laminate are shown in Table 1. Incidentally, the refractive index of the obtained cured resin layer was 1.50.

Example A4

A transparent electroconductive laminate was obtained in the same manner as in Example A1, except for changing the film thickness of the cured resin layer of Example A1 to 1.0 μm. The characteristics of the produced transparent electroconductive laminate are shown in Table 1. Incidentally, the refractive index of the obtained cured resin layer was 1.50.

Reference Example A1

The transparent electroconductive laminate of Reference Example A1 was produced as follows.

A transparent electroconductive laminate was obtained in the same manner as in Example A1, except for not using the dispersion liquid of metal fluoride ultrafine particle of Example A1. The characteristics of the produced transparent electroconductive laminate are shown in Table 1. Incidentally, the refractive index of the obtained cured resin layer was 1.50.

Comparative Example A1

A transparent electroconductive laminate was obtained in the same manner as in Example A1, except for using the following Coating Solution $S_A$ in place of Coating Solution $R_A$ used for forming the cured resin layer of Example A1, and changing the film thickness to 2 μm. The characteristics of the produced transparent electroconductive laminate are shown in Table 1. Incidentally, the refractive index of the obtained cured resin layer was 1.51.

(Composition of Coating Solution $S_A$)

Tetrafunctional acrylate: 100 parts by mass ("ARONIX" M-405, produced by Toagosei Co., Ltd.) (refractive index after polymerization: 1.51)

Silica particles having an average primary particle diameter of 3.0 μm (refractive index: 1.48): 1 part by mass Photoreaction initiator: 5 parts by mass ("Irgacure" 184, produced by Ciba Specialty Chemicals Corp.)

Diluent: an appropriate amount (isobutyl alcohol)

Comparative Example A2

A transparent electroconductive laminate was obtained in the same manner as in Example A1, except for using the following Coating Solution $T_A$ in place of Coating Solution $R_A$ used for forming the cured resin layer of Example A1.

The characteristics of the produced transparent electroconductive laminate are shown in Table 1. Since the cured resin layer formed of Coating Solution $T_A$ is a reference cured resin layer with no haze, the transparent electroconductive laminate of Comparative Example A2 is used as a reference transparent electroconductive laminate, and the haze thereof is used as a reference haze (H2). Incidentally, the refractive index of the obtained cured resin layer was 1.51.
(Composition of Coating Solution $T_A$)

Tetrafunctional acrylate: 100 parts by mass ("ARONIX" M-405, produced by Toagosei Co., Ltd.) (refractive index after polymerization: 1.51)

Photoreaction initiator: 5 parts by mass ("Irgacure" 184, produced by Ciba Specialty Chemicals Corp.)

Diluent: an appropriate amount (isobutyl alcohol)

protective film was significantly larger than in the case of the transparent electroconductive laminate having a conventional lubricating layer (Comparative Example A1). Accordingly, in the case of the transparent electroconductive laminate of Reference Example A1, for example, separating of the surface protective film cannot be carried out in the same manner as in the case of the transparent electroconductive laminate having a conventional lubricating layer (Comparative Example A1).

The transparent electroconductive laminate having a conventional lubricating layer of Comparative Example A1 was excellent in the lubricity, but exhibited poor haze characteristics when an adhesive layer and a second transparent substrate were stacked thereon in order, due to light scattering by inorganic fine particles. The transparent electro-

TABLE 1

| | | Example A1 | Example A2 | Example A3 | Example A4 | Reference Example A1 | Comparative Example A1 | Comparative Example A2 |
|---|---|---|---|---|---|---|---|---|
| Surface roughness | Arithmetic average roughness (Ra) (nm) | 160 | 140 | 210 | 10 | 210 | 90 | 30 |
| | Ten-point average roughness (Rz) (nm) | 1000 | 850 | 1200 | 200 | 1250 | 650 | 60 |
| Lubricity of cured resin layer having uneven surface | | A | A | A | A | A | A | B |
| Haze value (%) | First transparent substrate (with ITO layer) (substrate material) | 0.11 (PC) | 0.11 (PC) | 0.73 (PET) | 0.11 (PC) | 0.11 (PC) | 0.11 (PC) | 0.11 (PC) |
| | Second transparent substrate (substrate material) | 0.11 (PC) | 0.11 (PC) | 0.11 (PC) | 0.11 (PC) | 0.11 (PC) | 0.11 (PC) | 0.11 (PC) |
| | Without adhesive layer and second transparent substrate | 6.59 | 5.19 | 7.23 | 0.76 | 8.22 | 1.78 | 0.25 |
| | With adhesive layer and second transparent substrate | 0.22 (H1) | 0.22 (H1) | 0.86 — | 0.18 (H1) | 0.23 (H1) | 1.28 (H1) | 0.20 (H2) |
| | (H1-H2) | 0.02 | 0.02 | — | −0.02 | 0.03 | 1.08 | (0) |
| Surface characteristics | Contact angle of water (°) | 83 | 81 | 83 | 82 | 86 | 83 | 83 |
| | Peel-Off force (N/30 mm) | 0.33 | 0.30 | 0.34 | 0.36 | 0.49 | 0.33 | 0.55 |

As apparent from Table 1, the transparent electroconductive laminates of Examples A1 to A4 were excellent in the lubricity. Furthermore, in the case of stacking an adhesive layer and a second transparent substrate in order, the transparent electroconductive laminates of Examples A1 to A4 were excellent also in the haze characteristics. More specifically, in the case of stacking an adhesive layer and a second transparent substrate in order, the haze value (H1) of the transparent electroconductive laminates of Examples A1, A2 and A4 was excellent, and equal to the haze value (H2) of the reference transparent electroconductive laminate of Comparative Example A2 which was a reference cured resin layer with no haze.

In addition, the transparent electroconductive laminates of Examples A1 to A4 have the same surface characteristics, particularly the same peel-off force of the temporary protective film, as those of the transparent electroconductive laminate having a conventional lubricating layer (Comparative Example A1). Therefore, for example, separating of the surface protective film can be carried out in the same manner as in the case of a transparent electroconductive laminate having a conventional lubricating layer (Comparative Example A1).

On the other hand, the transparent electroconductive laminate of Reference Example A1 was excellent in the lubricity and haze characteristics. However, it was different in the surface characteristics from the transparent electroconductive laminate having a conventional lubricating layer (Comparative Example A1). Particularly, in Reference Example A1 the peel-off force of the temporary surface conductive laminate of Comparative Example A2 was excellent in the haze characteristics when an adhesive layer and a second transparent substrate were stacked thereon in order, but was poor in the handleability due to no lubricity.

Examples B1 to B3 and Comparative Examples B1 and B2

Each of transparent electroconductive laminates of Examples B1 to B3 and Comparative Examples B1 and B2 was configured as shown in FIG. 4, and measured for the haze value of the transparent electroconductive laminate before and after stacking the adhesive layer and the second transparent substrate thereon. The results are shown in Table 2 below. Specifically, these transparent electroconductive laminates were produced as follows.

Example B1

The transparent electroconductive laminate of Example B1 was produced as follows.
(Formation of Cured Resin Layer)

Coating Solution $R_B$, which was the same as Coating Solution $R_A$ except for not containing the dispersion liquid of metal fluoride ultrafine particles, was coated by a bar coating method on one surface of a 100 μm-thick carbonate (PC) film (C110, produced by Teijin Chemicals, Ltd.) (first transparent substrate, haze value: 0.11%), dried at 30° C. for 1 minute, and then cured through irradiation with ultraviolet ray, and thereby a cured resin layer having a thickness of 3.0 μm and a refractive index of 1.50 was obtained.

(Formation of ITO Layer)

Subsequently, Transparent Electroconductive Layer-1 (ITO layer) was formed on the other surface than the surface on which the cured resin layer was formed, by a sputtering method using an indium oxide-tin oxide target having a composition of indium oxide and tin oxide in a weight ratio of 95:5 and having a filling density of 98%. The thickness of the ITO layer was about 20 nm, and the surface resistance value was about 350 Ω/sq.

(Fabrication of Transparent Electroconductive Laminate)

Furthermore, an acrylic pressure-sensitive adhesive (refractive index: 1.50) and a 100 μm-thick polycarbonate (PC) film (C110, produced by Teijin Chemicals, Ltd., haze value: 0.11%) (second transparent substrate) were laminated in order on the cured resin layer to fabricate a transparent electroconductive laminate.

The characteristics of the produced transparent electroconductive laminate are shown in Table 2.

Example B2

A transparent electroconductive laminate was obtained in the same manner as in Example B1, except for changing the drying temperature of Coating Solution $R_B$ of Example B1 to 70° C. The characteristics of the produced transparent electroconductive laminate are shown in Table 2. Incidentally, the refractive index of the obtained cured resin layer was 1.50.

Example B3

A transparent electroconductive laminate was obtained in the same manner as in Example B1, except for using a 188 μm-thick polyethylene terephthalate (PET) film (OFW, produced by Teijin DuPont Films Japan Limited, haze value: 0.73%) in place of the first transparent substrate (PC) of Example B1, and changing the drying temperature of Coating Solution $R_B$ to 70° C. The characteristics of the produced transparent electroconductive laminate are shown in Table 2.

Incidentally, the refractive index of the obtained cured resin layer was 1.50.

Comparative Example B1

The transparent electroconductive laminate of Comparative Example B1 was produced as follows.

A transparent electroconductive laminate was obtained in the same manner as in Example B1, except for using the following Coating Solution $S_B$ in place of Coating Solution $R_B$ used for forming the cured resin layer of Example B1, and changing the film thickness to 2 μm. The characteristics of the produced transparent electroconductive laminate are shown in Table 2. Incidentally, the refractive index of the obtained cured resin layer was 1.51.

(Composition of Coating Solution $S_B$)

Tetrafunctional acrylate: 100 parts by mass ("ARONIX" M-405, produced by Toagosei Co., Ltd.) (refractive index after polymerization: 1.51)

Silica particles having an average primary particle diameter of 3.0 μm (refractive index: 1.48): 1 part by mass Photoreaction initiator: 5 parts by mass ("Irgacure" 184, produced by Ciba Specialty Chemicals Corp.)

Diluent: an appropriate amount (isobutyl alcohol)

Comparative Example B2

A transparent electroconductive laminate was obtained in the same manner as in Example B1, except for using the following Coating Solution $T_B$ in place of Coating Solution $R_B$ used for forming the cured resin layer of Example B1. The characteristics of the produced transparent electroconductive laminate are shown in Table 2. Since the cured resin layer formed of Coating Solution $T_B$ is a reference cured resin layer with no haze, the transparent electroconductive laminate of Comparative Example B2 is used as a reference transparent electroconductive laminate, and the haze thereof is used as a reference haze (H2). Incidentally, the refractive index of the obtained cured resin layer was 1.51.

(Composition of Coating Solution $T_B$)

Tetrafunctional acrylate: 100 parts by mass ("ARONIX" M-405, produced by Toagosei Co., Ltd.) (refractive index after polymerization: 1.51)

Photoreaction initiator: 5 parts by mass ("Irgacure" 184, produced by Ciba Specialty Chemicals Corp.)

Diluent: an appropriate amount (isobutyl alcohol)

TABLE 2

| | | Example B1 | Example B2 | Example B3 | Comparative Example B1 | Comparative Example B2 |
|---|---|---|---|---|---|---|
| Surface roughness | Arithmetic average roughness (Ra) (nm) | 210 | 70 | 250 | 90 | 30 |
| | Ten-point average roughness (Rz) (nm) | 1250 | 450 | 1400 | 650 | 60 |
| Lubricity of cured resin layer having uneven surface | | A | A | A | A | B |
| Haze value (%) | First transparent substrate (with ITO layer) (substrate material) | 0.12 (PC) | 0.12 (PC) | 0.71 (PET) | 0.12 (PC) | 0.12 (PC) |
| | Second transparent substrate (substrate material) | 0.11 (PC) | 0.11 (PC) | 0.11 (PC) | 0.11 (PC) | 0.11 (PC) |
| | Without adhesive layer and second transparent substrate | 8.22 | 2.94 | 9.83 | 1.78 | 0.25 |
| | With adhesive layer and second transparent substrate | 0.23 (H1) | 0.22 (H1) | 0.87 — | 1.28 (H1) | 0.20 (H2) |
| | (H1-H2) | 0.03 | 0.02 | — | 1.16 | (0) |

As apparent from Table 2, the transparent electroconductive laminates of Examples B1 to B3 were excellent in the lubricity. Furthermore, in the case of stacking an adhesive layer and a second transparent substrate in order, the transparent electroconductive laminates of Examples B1 to B3 were excellent also in the haze characteristics. More specifically, in the case of stacking a adhesive layer and a second transparent substrate in order, the haze value (H1) of the transparent electroconductive laminates of Examples B1 and B2 was excellent and equal to the haze value (H2) of the reference transparent electroconductive laminate of Comparative Example B2 using a reference cured resin layer with no haze.

On the other hand, the transparent electroconductive laminate of Comparative Example B1 was excellent in the lubricity, but exhibited poor haze characteristics due to light scattering by inorganic fine particles in the case of stacking an adhesive layer and a transparent substrate B in order. Also, the transparent electroconductive laminate of Comparative Example B2 was excellent in the haze characteristics in the case of stacking an adhesive layer and a transparent substrate B in order, but was poor in the lubricity because the surface of the cured resin layer was flat.

DESCRIPTION OF NUMERICAL REFERENCES 1, 1', 1" Transparent organic polymer substrate
2, 2', 2" Transparent electroconductive layer
3, 3', 3" Cured resin layer having an uneven surface
4, 4', 4" Adhesive layer
5, 5', 5" Second transparent substrate
6 Base material (plastic film)
7 Adhesive layer
10, 20, 50 Transparent electroconductive laminate
20' Transparent electroconductive laminate (fixed electrode base material)
20" Transparent electroconductive laminate (movable electrode base material)
30 Temporary surface protective film
100 Transparent touch panel

The invention claimed is:

1. A transparent electroconductive laminate, comprising a transparent organic polymer substrate having a thickness of 10 to 500 μm, a transparent electroconductive layer on one surface of said transparent organic polymer substrate, and a cured resin layer having an uneven surface on another surface of said transparent organic polymer substrate,
   wherein said cured resin layer has an uneven surface formed from a coating composition containing at least first and second components which undergo phase separation due to the difference in physical properties thereof,
   wherein (i) the difference between the SP value of the first component and the SP value of the second component is 0.5 or more, and/or (ii) either one of the first and second components has a glass transition temperature (Tg) lower than the ambient temperature at the coating of the composition, and the other has a glass transition temperature (Tg) higher than the ambient temperature at the coating of the composition, and/or (iii) the difference between the surface tension of the first component and the surface tension of the second component is from 1 to 70 dyn/cm, wherein said cured resin layer does not contain inorganic and/or organic fine particles having an average primary particle diameter of 200 nm or more,
   wherein said cured resin layer contains metal oxide and/or metal fluoride ultrafine particles having an average primary particle diameter of less than 200 nm,
   wherein the amount of said ultrafine particles contained in said cured resin layer is from 0.01 to 7.5 parts by mass per 100 parts by mass of said cured resin component, and
   wherein the uneven surface of the cured resin layer is a surface adapted to receive an adhesive layer and a second transparent substrate.

2. The transparent electroconductive laminate according to claim 1, wherein the arithmetic average roughness (Ra) of the uneven surface of said cured resin layer is from 5 nm to less than 500 nm, and the ten-point average roughness (Rz) of the uneven surface of said cured resin layer is from 50 nm to less than 2,000 nm.

3. The transparent electroconductive laminate according to claim 2, which further comprises a temporary surface protective film laminated on the uneven surface of said cured resin layer.

4. The transparent electroconductive laminate according to claim 2, wherein an adhesive layer and a second transparent substrate are stacked in order on the uneven surface of said cured resin layer.

5. The transparent electroconductive laminate according to claim 1, which further comprises a temporary surface protective film laminated on the uneven surface of said cured resin layer.

6. The transparent electroconductive laminate according to claim 1, wherein an adhesive layer and a second transparent substrate are stacked in order on the uneven surface of said cured resin layer.

7. The transparent electroconductive laminate according to claim 6, wherein the transparent electroconductive laminate satisfies the following relationship, assuming that the same transparent electroconductive laminate as said transparent electroconductive laminate except for having a haze-free reference cured resin layer in place of said cured resin layer having an uneven surface is a reference transparent electroconductive laminate:

$$-0.1 < H1 - H2 < 1.0$$

(wherein
   H1: the haze value (%) of said transparent electroconductive laminate which has an adhesive layer and a second transparent substrate stacked in order on the uneven surface of said cured resin layer having an uneven surface, and
   H2: the haze value (%) of said reference transparent electroconductive laminate having said adhesive layer and said second transparent substrate stacked in order on the surface of said reference cured resin layer).

8. The transparent electroconductive laminate according to claim 1, wherein said ultrafine particle is magnesium fluoride.

9. A transparent touch panel, comprising two transparent electrode substrates each having a transparent electroconductive layer provided on at least one surface, which are disposed by arranging respective transparent electroconductive layers to face each other,
   wherein the transparent electroconductive laminate claimed in claim 1 is used as at least one of said two transparent electrode substrates.

10. The transparent electroconductive laminate according to claim 1,
   wherein the difference between the SP value of the first component and the SP value of the second component is 0.5 or more, and
   wherein the first component is an oligomer or a resin and the second component is a monomer.

11. The transparent electroconductive laminate according to claim 10,
   wherein the first component is an unsaturated double bond-containing acrylic copolymer, and the second component is a polyfunctional unsaturated double bond-containing monomer.

12. The transparent electroconductive laminate according to claim 1, wherein either one of the first and second components has a glass transition temperature (Tg) lower than the ambient temperature at the coating of the composition, and the other has a glass transition temperature (Tg) higher than the ambient temperature at the coating of the composition.

13. The transparent electroconductive laminate according to claim 1, wherein the difference between the surface tension of the first component and the surface tension of the second component is from 1 to 70 dyn/cm.

14. A transparent electroconductive laminate, comprising a transparent organic polymer substrate having a thickness of 10 to 500 μm, a transparent electroconductive layer on one surface of said transparent organic polymer substrate, and a cured resin layer having an uneven surface on another surface of said transparent organic polymer substrate,
- wherein said cured resin layer has an uneven surface formed from a coating composition containing at least first and second components which undergo phase separation due to the difference in physical properties thereof,
- wherein (i) the difference between the SP value of the first component and the SP value of the second component is 0.5 or more, and/or (ii) either one of the first and second components has a glass transition temperature (Tg) lower than the ambient temperature at the coating of the composition, and the other has a glass transition temperature (Tg) higher than the ambient temperature at the coating of the composition, and/or (iii) the difference between the surface tension of the first component and the surface tension of the second component is from 1 to 70 dyn/cm,
- wherein said cured resin layer does not contain inorganic and/or organic fine particles for forming the uneven surface,
- wherein the arithmetic average roughness (Ra) of the uneven surface of said cured resin layer is from 5 nm to less than 500 nm,
- wherein the ten-point average roughness (Rz) of the uneven surface of said cured resin layer is from 50 nm to less than 2,000 nm,
- wherein the transparent electroconductive laminate further comprises an adhesive layer and a second transparent substrate which are stacked in this order on the uneven surface of said cured resin layer,
- wherein the adhesive layer is a pressure-sensitive adhesive or curable resin, and
- wherein the second transparent substrate is a transparent plastic film, a transparent plastic plate, or a glass plate.

15. A transparent touch panel, comprising two transparent electrode substrates each having a transparent electroconductive layer provided on at least one surface, which are disposed by arranging respective transparent electroconductive layers to face each other,
- wherein the transparent electroconductive laminate claimed in claim 14 is used as at least one of said two transparent electrode substrates.

16. The transparent electroconductive laminate according to claim 14,
- wherein the difference between the SP value of the first component and the SP value of the second component is 0.5 or more, and
- wherein the first component is an oligomer or a resin and the second component is a monomer.

17. The transparent electroconductive laminate according to claim 16,
- wherein the first component is an unsaturated double bond-containing acrylic copolymer, and the second component is a polyfunctional unsaturated double bond-containing monomer.

18. The transparent electroconductive laminate according to claim 14, wherein either one of the first and second components has a glass transition temperature (Tg) lower than the ambient temperature at the coating of the composition, and the other has a glass transition temperature (Tg) higher than the ambient temperature at the coating of the composition.

19. The transparent electroconductive laminate according to claim 14, wherein the difference between the surface tension of the first component and the surface tension of the second component is from 1 to 70 dyn/cm.

* * * * *